(12) United States Patent
Weick

(10) Patent No.: US 9,511,450 B2
(45) Date of Patent: Dec. 6, 2016

(54) APPARATUS FOR FOCUSING A LASER BEAM AND METHOD FOR MONITORING A LASER PROCESSING OPERATION

(71) Applicant: TRUMPF Werkzeugmaschinen GmbH + Co. KG, Ditzingen (DE)

(72) Inventor: Juergen-Michael Weick, Asperg (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 346 days.

(21) Appl. No.: 14/051,658

(22) Filed: Oct. 11, 2013

(65) Prior Publication Data

US 2014/0042133 A1 Feb. 13, 2014

Related U.S. Application Data

(63) Continuation of application No. PCT/EP2012/055278, filed on Mar. 26, 2012.

(30) Foreign Application Priority Data

Apr. 12, 2011 (DE) .................. 10 2011 007 176

(51) Int. Cl.
 *B23K 26/00* (2014.01)
 *B23K 26/02* (2014.01)
 (Continued)

(52) U.S. Cl.
 CPC ......... *B23K 26/0869* (2013.01); *B23K 26/032* (2013.01); *B23K 26/048* (2013.01);
 (Continued)

(58) Field of Classification Search
 CPC . B23K 26/032; B23K 26/048; B23K 26/0869; B23K 26/426; B23K 26/428; G01J 1/0414; G01J 1/4257
 (Continued)

(56) References Cited

U.S. PATENT DOCUMENTS 3,799,679 A * 3/1974 Simko ..................... 356/431
4,799,755 A * 1/1989 Jones ....................... 385/38
(Continued)

FOREIGN PATENT DOCUMENTS

CN 201210132 Y 3/2009
DE 19630607 C1 10/1997
(Continued)

OTHER PUBLICATIONS

English Translation of DE102007039878, May 2008.*
(Continued)

*Primary Examiner* — Sang Y Paik
(74) *Attorney, Agent, or Firm* — Fish & Richardson P.C.

(57) ABSTRACT

An apparatus for focusing a laser beam on a workpiece includes at least one transmissive optical element which is arranged at a tilting angle with respect to a plane perpendicular to a beam axis of the laser beam, the transmissive optical element comprising a first side and a second side through which the laser beam passes, a spatially-resolving detector configured to detect laser radiation reflected from the transmissive optical element, and an image evaluation device coupled to the detector, the image evaluation device configured to distinguish laser radiation reflected from the first side of the optical element from laser radiation reflected from the second side of the optical element.

17 Claims, 1 Drawing Sheet

(51) Int. Cl.
  *B23K 26/08* (2014.01)
  *B23K 26/03* (2006.01)
  *B23K 26/04* (2014.01)
  *G01J 1/42* (2006.01)
  *G01J 1/04* (2006.01)

(52) U.S. Cl.
  CPC .......... *B23K 26/705* (2015.10); *B23K 26/707* (2015.10); *G01J 1/0414* (2013.01); *G01J 1/4257* (2013.01)

(58) Field of Classification Search
  USPC .......... 219/121.6–121.83; 356/237.1, 239.1, 356/239.2
  See application file for complete search history.

(56) References Cited

U.S. PATENT DOCUMENTS

| | | | |
|---|---|---|---|
| 5,132,950 | A | 7/1992 | Sato et al. |
| 5,418,638 | A | 5/1995 | Hirasawa |
| 6,088,092 | A * | 7/2000 | Chen et al. ................. 356/237.2 |
| 6,410,906 | B1 | 6/2002 | Ito et al. |
| 7,023,538 | B2 * | 4/2006 | Hutt et al. ................. 356/237.1 |
| 7,385,698 | B1 * | 6/2008 | Welch et al. ................. 356/369 |
| 7,768,660 | B1 * | 8/2010 | Pribil et al. ................. 356/639 |
| 2004/0008342 | A1 | 1/2004 | Hutt et al. |
| 2005/0057746 | A1 | 3/2005 | Takahashi et al. |
| 2007/0291379 | A1 | 12/2007 | Lambert et al. |
| 2009/0127429 | A1 | 5/2009 | Kittelmann et al. |
| 2010/0135356 | A1 | 6/2010 | Schulz |

FOREIGN PATENT DOCUMENTS

| | | |
|---|---|---|
| DE | 29903385 U1 | 6/1999 |
| DE | 102006007750 A1 | 8/2007 |
| DE | 102007039878 A1 | 5/2008 |
| DE | 202008010495 U1 | 11/2008 |
| DE | 102007030398 A1 | 1/2009 |
| DE | 102007053632 A1 | 5/2009 |
| EP | 1354664 A1 | 4/2002 |
| EP | 1643281 A1 | 10/2004 |
| EP | 1488882 A1 | 12/2004 |
| JP | 04205111 A | 7/1992 |
| JP | H0751875 A | 2/1995 |
| JP | 2000094173 A | 4/2000 |

OTHER PUBLICATIONS

English Translation of DE 19630607, Oct. 1997.*
International Search Report from corresponding PCT Application No. PCT/EP2012/055278, mailed Jul. 10, 2012, 6 pages.
Notification of Transmittal of Translation of the International Preliminary Report on Patentability for corresponding PCT Application No. PCT/EP2012/055278, mailed Oct. 24, 2013, 8 pages.

* cited by examiner

APPARATUS FOR FOCUSING A LASER BEAM AND METHOD FOR MONITORING A LASER PROCESSING OPERATION

CROSS REFERENCE TO RELATED APPLICATIONS

This application is a continuation of and claims priority under 35 U.S.C. §120 to PCT Application No. PCT/EP2012/055278 filed on Mar. 26, 2012, which claimed priority to German Application No. 10 2011 007 176.8 filed on Apr. 12, 2011. The contents of both of these priority applications are hereby incorporated by reference in their entirety.

TECHNICAL FIELD

The present description relates to an apparatus, in particular a laser processing head for focusing a laser beam on a workpiece and a method for monitoring a laser processing operation using a focused laser beam.

BACKGROUND

DE 10 2007 053 632 discloses a method for coaxial beam analysis in optical systems. A defined percentage of the (laser) beam is reflected back therein coaxially or at a small angle via an optical surface which is located perpendicularly relative to the main beam, in particular a protective glass, and separated from the main beam for the beam analysis using a beam splitter. In order to be able to carry out a separation at the image side of partial beams which are reflected at the upper side and the lower side of the optical element, the optical element may have a wedge angle. Owing to the separated measurement of the partial beams, contamination at one side of the optical element is to be diagnosed.

EP 1 354 664 A1 describes a device for monitoring an optical element, in particular a protective glass of a processing head for processing a workpiece, which device has a separate light source for coupling a light beam into the optical element at an optical surface facing away from the workpiece and a detector for detecting a light beam reflected in the region of the optical surface facing the workpiece. In this instance, the light beam is reflected at the optical surface facing the workpiece on contaminants, for example, on smoke or splashes.

EP 1488 882 A1 also describes a device for monitoring an optical element, in particular a protective glass, in which the monitoring is carried out by the detection of scattered light on the optical element and the detection of scattered light on an additional optical element as a reference. In addition, detection of scattered light in the intermediate space between the first and the second optical element is provided for in order to determine the degree of contamination and the type of contamination (splashes or smoke).

In order to monitor the degree of contamination of a protective glass, it is known from DE 299 03 385 U1 to use a sensor which is arranged laterally on the protective glass and which is insensitive to the laser radiation itself but is sensitive to infrared thermal radiation which is emitted by dirt particles on the protective glass.

DE 10 2007 030 398 A1 describes an apparatus and a method for monitoring the temperature and/or a temperature-dependent characteristic value of an optical element wherein measurement radiation is emitted onto the optical element, at least a portion of the measurement radiation which has passed through the optical element is detected and the temperature or the temperature-dependent characteristic value is monitored based on a predetermined relation to the intensity of the detected measurement radiation.

EP 1 643 281 A1 discloses an optical element for installation in a mount, which has on the peripheral face thereof at least one profiling (for example, a notch). The mount may have a resiliently supported clamping member which has a pressing face for applying pressure in a radial direction onto the profiling and which includes a temperature sensor for measuring the temperature of the optical element.

DE 20 2008 010 495 U1 discloses an optical element and an apparatus for monitoring the optical element. The optical element has a base member which transmits radiation and which has on a peripheral face at least one planar face, the planar face being connected to a plate-like member which is transmissive for measurement radiation and the face of the plate-like member facing away from the base member having a coating which is reflective or anti-reflective for the measurement radiation.

In the above-described documents, the monitoring of the optical element is intended inter alia to serve to detect temperature changes during the operation of the optical element, which act on the optical properties thereof. In particular, a displacement of the focal position (focal drift) is intended to be identified in this manner.

JP20000094173 describes a device for adjusting the focal position of a laser beam which compensates for fluctuations of the focal position ("hot lens effect") brought about by the heating of a focusing lens by the focusing lens being appropriately displaced in an axial direction. On the focusing lens, a temperature sensor is laterally arranged which is intended to enable the temperature of the focusing lens to be measured in real time.

From JP 7051875 A, it is known to arrange a device for detecting a laser beam diameter in the beam path downstream of a focusing lens of a laser processing head. Based on the detected diameter, a distance between the focusing lens and a workpiece is intended to be adjusted in an optimum manner by a device for automatic focal position adjustment.

DE 196 30 607 C1 discloses an apparatus for monitoring the energy of a laser beam, in which a laser beam is directed through a window into a chamber in order to irradiate a substrate. By inclined positioning of the window with respect to the axis of the laser beam, a beam portion is coupled out from the laser beam and directed onto a detector.

DE 10 2007 039 878 A1 discloses an apparatus and a method for focal position stabilization in optical systems for high-power laser radiation, wherein the focal point is displaced by movable optical elements and a control system in the event of a laser-beam-induced focal position change in the opposite direction so that the focal point overall remains in the desired position. The information required for the correction can be calculated by the momentary power of the laser beam. In order to measure this, there may be arranged in the beam path of the optical system at an angle with respect to the optical axis a plane-parallel plate on which a small constant fraction of the laser beam is redirected onto an optical sensor.

SUMMARY

An advantage of the present invention is to improve an apparatus for focusing a laser beam onto a workpiece and a method for monitoring a laser processing operation. This advantage is achieved with an apparatus which has means for distinguishing laser radiation reflected from a first side of the optical element from laser radiation reflected from a second side of the optical element. Using these means, it is possible, for example, to determine the degree of contamination of the optical element (see below).

It is proposed that a transmissive optical element be arranged in the beam path of the laser beam not, as otherwise conventional, with the optical axis thereof in a plane perpendicular relative to the beam axis, but instead that the optical element be tilted with respect to this plane. In the simplest case, the optical element may be an optical element without refractivity, for example, a planar plate in the form of a protective glass. In this instance (with a small plate thickness), tilting of the optical element has no or only extremely small effects on the beam path of the laser beam transmitted by the optical element.

Other optical elements can also be arranged so as to be inclined at a tilting angle in order to couple out laser radiation for beam analysis or to monitor the laser processing operation in an area beside the beam path of the laser beam. In the context of this application, the term tilting is intended to be understood to mean that both an inlet face and an outlet face of the optical element are inclined relative to the plane perpendicular relative to the beam axis. This is necessary so that the laser radiation is not reflected back into the beam path of the laser beam.

Owing to the tilting of the optical element, the laser radiation reflected back can be detected directly using a spatially resolving detector arranged beside the beam path of the laser beam. An additional outcoupling element in the form of a beam splitter—as described, for example, in DE 10 2007 053 632 A1—can in this instance be dispensed with since the back reflection does not run (almost) coaxially relative to the laser beam.

In an advantageous embodiment, the means for distinguishing the reflected laser radiation include an image evaluation device which is coupled to the detector. Owing to the inclined position of the optical element, the laser radiation which is reflected on both optical faces strikes the detector at different locations or impact regions. Since the spatial separation of the impact regions is small owing to the typically small thickness of the optical element or the relatively small tilting angle, so that the impact regions may overlap, an image evaluation device can be used to determine the size of the impact region (i.e., the size of the incident beam spot) of the laser radiation reflected from the respective side.

In another embodiment, the means include an aperture for suppressing the laser radiation reflected back from one of the sides. The laser radiation reflected back from one of the two sides can also be suppressed by a (pin) aperture so that only the laser radiation reflected back from the other side of the optical element is detected by the detector. Of course, the pinhole may also be displaced in order to alternatively suppress the laser radiation reflected back from one side or the other of the optical element.

In another embodiment, the spatially resolving detector, which can be constituted by individual detectors (e.g., by a CCD chip) is arranged at the tilting angle with respect to the plane perpendicular relative to the beam axis of the reflected radiation. The tilting of the detector or the detector face, in particular with a planar plate as the optical element, leads to the beam path of laser radiation reflected at an optical face at an inlet side and the beam path of laser radiation reflected at an optical face at an outlet side to the detector being equal. This is particularly advantageous since in this instance the measured intensities or the surface region in which the laser radiation reflected from the different sides of the optical element strikes is ideally of the same size owing to the identical distance in the beam propagation direction. In particular, the differences of the measured intensities or the sizes of the surface regions can thereby also be directly compared and consequently evaluated.

In one embodiment, the transmissive optical element is arranged in the convergent beam path of the laser beam, in particular after the last focusing lens. In this manner, the influences of all optical components present in the beam path upstream of the transmissive optical element can be taken into account during the monitoring operation.

In another embodiment, the apparatus includes a beam-shaping optical element which is arranged in the beam path of the laser beam upstream of the optical element, in particular a focusing lens, for focusing the laser beam onto the workpiece. The transmissive optical element may in this instance be arranged in the convergent beam path downstream of the focusing lens so that the tilting angle which is required to redirect the laser radiation which is reflected from the beam path of the (main) beam, so that it does not strike the focusing lens again, may be selected to be comparatively small.

For example, the tilting angle in this instance may be between 5° and 25°, typically between 10° and 20°, the precise selection of the tilting angle being dependent inter alia on the focal length of the focusing lens and the distance between the optical element and the focusing lens. The reflection of the laser radiation is typically carried out in this instance on an anti-reflective coating of the optical element which is applied to both mutually opposing optical faces of the optical element so that only a small proportion of, for example, approximately 0.2% of the laser power is reflected on both faces.

In another embodiment, the detector is arranged at a distance from the focusing lens which corresponds to the focal length of the focusing lens. This is advantageous since (ideally, that is to say, without temperature-related changes of the optical properties of the focusing lens), the redirected laser radiation is focused precisely on the detector face. Even with small fluctuations of the focal position about this zero position, the laser radiation which is reflected back still strikes the detector in a highly localized manner.

In some embodiments, the apparatus includes a folding mirror for redirecting the reflected laser radiation onto the detector. The folding mirror enables the detector to be arranged in the vicinity of the beam path of the laser beam or the transmissive optical element and consequently enables structural space to be saved.

The apparatus is adapted to determine the contamination state of the optical element based on the laser radiation reflected from a first side of the optical element and based on the laser radiation reflected from a second side of the optical element. As set out above, the beam portions of the laser radiation reflected from both sides are imaged in a highly resolved manner and can therefore be distinguished from each other, the momentary focal position being able to be derived on the basis of the size of the respective beam spots on the detector, that is to say, the size of the respective spot varies in dependence of the focal position.

The laser radiation reflected from the first face of the optical element facing the focusing lens in this instance contains the thermal influences on the focal position of all the optical units upstream of the optical element. The laser radiation reflected from the second face facing away from the focusing lens is subjected to the thermal influences such as a focal displacement due to the material and the condition of the optical element, for example, due to contamination of the protective glass window. The difference of the two focal positions or the difference of the size of beam spots on the detector is therefore a measure for the thermal influence of the optical element and typically increases as the contamination increases. Of course, the information relating to the conditions above the optical element and the portions which are added due to a contamination of the optical element, can be evaluated in an appropriate manner depending on the objective of the process monitoring.

In some embodiments, the apparatus is adapted to determine the focal position of the laser beam based on the laser radiation detected by the detector. To this end, the size of the spot(s) of the laser radiation which is reflected back on the detector is determined. Since the distance between the detector face and the focusing lens and the focal length of the focusing lens is known, by using the size of a respective beam spot on the detector, it can be determined (approximately) how far the focal point is distant from the collimation lens and whether it has the desired distance to the workpiece.

In another embodiment, the apparatus includes a device for changing the focal position of the laser beam in the beam direction and a control device which is configured to control the device for changing the focal position in order to adjust the focal position to a desired focal position. The device for changing the focal position may, for example, be a (linear) drive for displacing the focusing lens in an axial direction (the beam propagation direction). Of course, optical elements which are arranged in the beam path upstream of the focusing lens can also be influenced by such a device in order to change the focal position in the beam direction. For example, when a lens system is used for the focusing, another lens which is upstream of the focusing lens in the beam propagation direction can be used to change the focal position. To this end, it is also possible for the curvature of an adaptive mirror which is arranged upstream of the lens in the beam path to be adjusted in an appropriate manner. The change of the focal position results in a change of the size of the incident spot of the laser radiation on the detector. In this instance, the control device may control or adjust the device for changing the focal position in such a manner that the size of the spot remains constant during the laser processing operation.

If the detector is arranged at a distance from the focusing lens which corresponds to the (nominal) focal length thereof, and if the upper side of the workpiece is arranged at a distance from the focusing lens which corresponds to the focal length, the control device can adjust the diameter of the impact region (i.e., the spot diameter), for example, in such a manner that it is always minimal. Of course, in some applications, the focal position is not intended to be located at the upper side of the workpiece. In this instance, starting from the measured zero position (minimum diameter), the focal position can first be modified as desired and the spot size of the reflected laser radiation attained after the modification can be kept constant.

Another aspect of the invention relates to a method for monitoring a laser processing operation of the type described herein, in which laser radiation reflected from a first side of the optical element is distinguished during detection from laser radiation reflected from a second side of the optical element. As set out above, due to the tilting of the optical element, an additional beam redirecting element, for example, in the form of a beam splitter, can be dispensed with and, by the distinction between laser radiation reflected from the two sides of the optical element, conclusions can be drawn regarding the processing operation.

In some embodiments, the method includes determining the focal position of the laser beam in the beam direction and/or a contamination state of the transmissive optical element arranged in the convergent beam path of the laser beam based on the detected laser radiation. The focal position or the contamination of the optical element can in this instance be determined in the manner described above in relation to the apparatus.

Other advantages will be appreciated from the description and the drawings. The above-mentioned features and those set out below can also be used individually or together in any combination. The embodiments shown and described are not intended to be understood to be a conclusive listing but instead are of exemplary nature for describing the invention.

DETAILED DESCRIPTION

Figure 1:
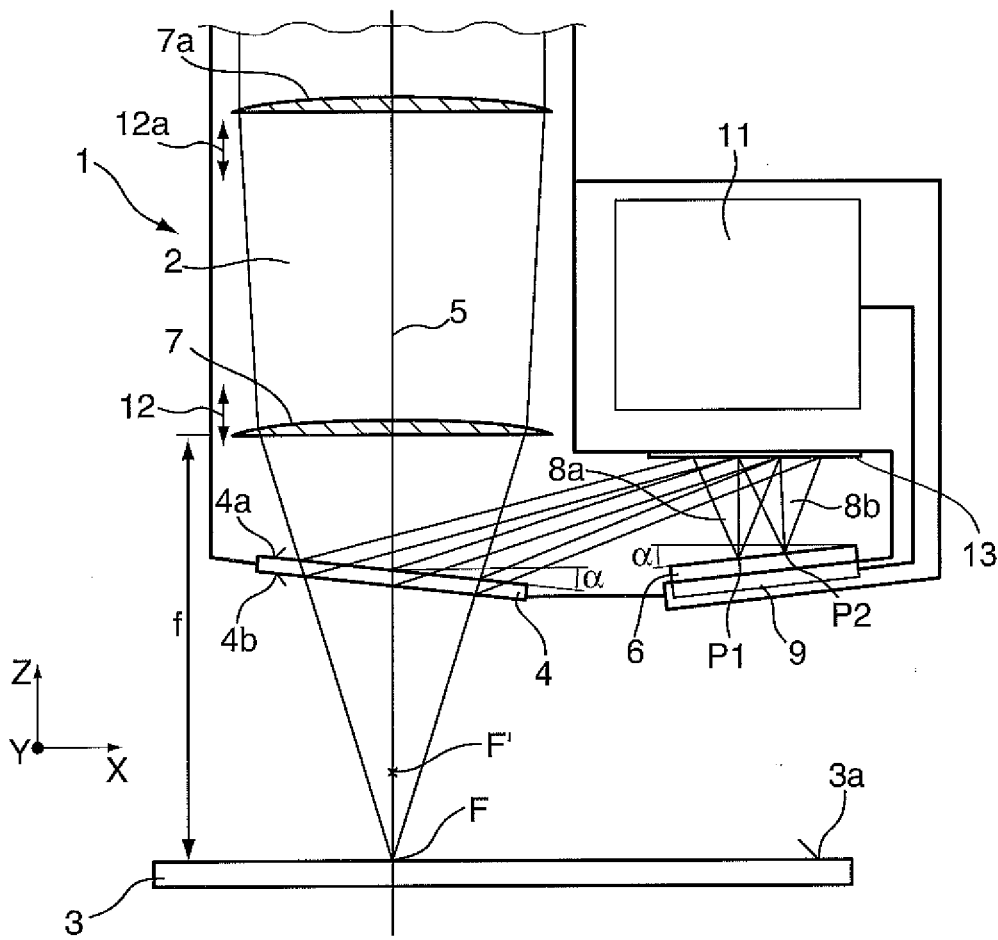
FIG. 1 is a schematic illustration of an embodiment of an apparatus for beam guidance of a laser beam in the form of a laser processing head.

FIG. 1 shows an apparatus in the form of a laser processing head 1 for focusing a laser beam 2 on a workpiece 3 which is part of a laser processing machine (not shown). The laser beam 2 is produced in this instance by a laser, for example, a Nd:YAG laser, and is guided to the laser processing head 1 by additional optical devices (not shown) which are used to guide the laser beam.

The laser processing head 1 has a transmissive optical element 4 in the form of a protective glass (thin planar plate), which is arranged at a tilting angle α with respect to a plane X, Y which extends perpendicularly relative to a beam axis 5 of the laser beam 2 (i.e., in the Z direction). The protective glass 4 serves to protect the optical components arranged inside the laser processing head 1 from contamination, for example, from smoke or splashes, which may occur during the processing of the workpiece 3 using the laser beam 2. In the beam path upstream of the protective glass 4, there is arranged in the laser processing head 1 a focusing lens 7 which serves to focus the laser beam 2 onto the workpiece 3, more precisely onto the upper side 3a thereof. The distance of the focusing lens 7 from an upper side 3a of the workpiece 3 corresponds in this instance to the focal length f of the focusing lens 7 so that a focal position F of the laser beam 2 in the beam direction 5 is located at the upper side 3a of the workpiece 3. In order to adjust the distance between the laser processing head 1 and the workpiece 3, a distance control unit (not shown) such as a capacitive distance control unit can be used.

The laser beam 2 extends through the transmissive protective glass 4 practically without redirection or without beam displacement, that is to say, the focusing lens 7 forms the last beam-forming optical element of the laser processing head 1. An anti-reflective coating which is applied (not shown) both at an upper side 4a of the protective glass 4 facing the focusing lens 7 and at a lower side 4b of the protective glass 4 facing away from the focusing lens 7. Despite this coating a small proportion of the laser radiation (approx. 0.2%) is reflected. This laser radiation 8a, 8b which is reflected back on the protective glass 4 is redirected via a folding mirror 13 and strikes a spatially resolving detector 6 (for example, a CCD chip) which is inclined at the same tilting angle α relative to the XY plane as the protective glass 4 (but in an opposite direction as compared to the protective glass 4).

In the present example, the tilting angle α is approximately 15° and is generally selected, in accordance with the focal length f of the focusing lens 7 and the distance of the protective glass 4 from the focusing lens 7, to be so large that the laser radiation 8a, 8b which is reflected back is coupled out from the beam path of the laser beam 2. That is to say, the laser radiation 8a, 8b does not strike the focusing lens 7, but instead can be detected by a detector 6 which is arranged adjacent to the laser beam 2. Typical values for the tilting angle α are between 5° and 25°, advantageous values between 10° and 20°.

As can be seen in FIG. 1, laser radiation 8a reflected back from the upper side 4a of the protective glass 4 strikes the detector 6 at a first point P1, whereas laser radiation 8b reflected back from the lower side 4b of the protective glass 4 strikes the detector 6 at a second point P2. That is to say, the tilting of the protective glass 4 leads to a displacement of the laser radiation 8a, 8b reflected from the respective side 4a, 4b of the protective glass 4 on the detector 6.

Figure 2A:
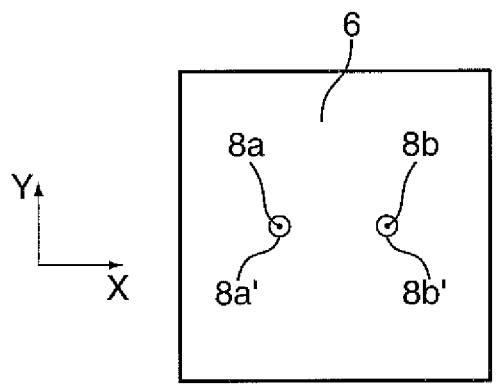
FIGS. 2a and 2b are schematic illustrations of a detector face of the apparatus of FIG. 1, with and without a pin aperture, respectively.

Based on the size or the diameter of the laser radiation 8a, 8b on the detector 6, that is to say, the size of the respective beam spot 8a, 8b, the focal position of the laser beam 2 can be determined since the size of the beam spot is related to the focal position. For example, with the setting shown in FIG. 1, if the focal position F is located on the surface 3a of the workpiece 3, the size of the beam spots 8a, 8b on the detector is minimal, that is to say, almost point-like, as can be seen in FIG. 2a. However, if the focusing lens 7 is moved upwards in the beam direction 5, that is to say, away from the workpiece 3, by a displacement device 12 in the form of a linear motor (which is indicated in FIG. 1 by a double-headed arrow), the focal position F is accordingly displaced into a focal position F' remote from the workpiece 3. Alternatively or in addition, in order to displace the focus, another lens 7a which is arranged in the beam propagation direction upstream of the focusing lens 7 can be displaced in the beam direction by a corresponding displacement device 12a (linear motor). When the focal position is displaced, the diameter of the spots of the laser radiation 8a', 8b' on the detector 6 increases with respect to the almost point-like spots, as can also be seen in FIG. 2a.

A focal position F, F' can consequently be associated with a respective diameter of the detected spot of laser radiation 8a, 8b or 8a', 8b' on the detector 6, for example, by determining the beam caustic of the laser beam beforehand. In this instance, by variation of the focal position the focal position F in which the spot size of the laser radiation is minimal is determined as a zero position.

In order to adjust the laser beam focus to a desired focal position, a control device 11 may suitably control the displacement device 12 or 12a in accordance with a signal, which is provided by an image evaluation device 9 which is connected to the detector 6, in such a manner that the size of a respective spot of the laser radiation 8a, 8b on the detector 6 and consequently the focal position F or F' is kept constant. In this manner, undesirable changes of the focal position owing to a thermal load of the optical elements of the laser processing head 1, such as, for example, the focusing lens 7, can be compensated.

As set out above, laser radiation 8a, 8b which is reflected from different sides 4a, 4b of the protective glass 4 strikes the detector 6 at different locations (in different spots) so that it is possible, using an image evaluation device 9, which is coupled to the detector 6, to associate the detected laser radiation spot 8a, 8b with the respective side 4a, 4b of the protective glass 4.

In the example shown in FIG. 2a, the protective glass 4 is not or is only slightly contaminated and the sizes of the spots of incident laser radiation 8a', 8b' correspond to each other. Therefore, the focal position, which is determined by the laser radiation 8a' reflected from the upper side 4a of the protective glass 4, corresponds to the focal position which is determined by the laser radiation 8b' reflected from the lower side 4b of the protective glass 4.

Figure 2B:
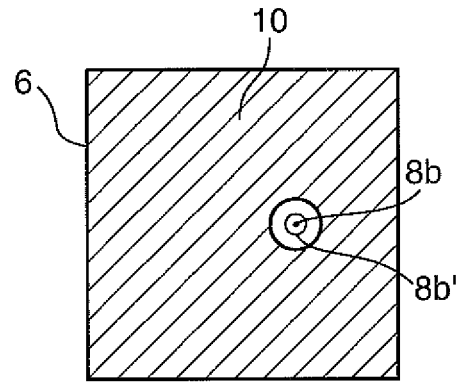

In the example illustrated in FIG. 2a, the laser radiation 8a', 8b' reflected by the respective side 4a, 4b is clearly mutually separated on the detector 6. This is not generally the case, that is to say, the respective spots 8a', 8b' may overlap on the detector surface 6. In this case, the image evaluation device 9 is required in order to carry out an association of the respective beam portions. Alternatively, a pin aperture 10 which is illustrated in FIG. 2b and which is arranged between the folding mirror 13 and the detector 6 can also be used to suppress the laser radiation 8a, 8a' reflected at the upper side 4a of the protective glass 4 and to detect only the laser radiation 8b, 8b' reflected at the lower side 4b. Of course, when the pin aperture is displaced in an appropriate manner, the laser radiation 8b, 8b' reflected from the lower side 4b can be suppressed.

In contrast to what is shown in FIG. 2a, the diameters of the laser radiation 8a', 8b' reflected from the two sides 4a, 4b of the protective glass 4 may differ. This can be explained in that the laser radiation 8a which is reflected at the upper side 4a of the protective glass 4 only takes into account the thermal influences on the focal position of all the optical units upstream of the protective glass 4. In contrast, the laser radiation 8b reflected from the lower side 4b is additionally subjected to the thermal influences of the protective glass 4, that is to say, this radiation is subjected to a focal point displacement owing to the heating of the protective glass material, for example, due to deposits of dirt. The difference of the two focal positions of the laser radiation 8a, 8b reflected on a respective side 4a, 4b of the protective glass 4 is therefore a measure for the thermal influence of the protective glass 4 which increases as the contamination increases. By a comparison between the sizes of the laser radiation spots 8a, 8b on the detector 6, the contamination of the protective glass 4 can consequently be monitored.

In summary, monitoring of a laser processing operation on a workpiece can be carried out in the above-described manner in which both the focal position of the laser beam in the propagation direction and the degree of contamination of the protective glass or optionally another optical element can be determined in a particularly simple manner.

A number of embodiments have been described. Nevertheless, it will be understood that various modifications may be made without departing from the spirit and scope of the invention. Accordingly, other embodiments are within the scope of the following claims.

The invention claimed is:

1. An apparatus for focusing a laser beam on a workpiece, comprising:
   at least one transmissive optical element which is arranged at a tilting angle with respect to a plane perpendicular to a beam axis of the laser beam, the transmissive optical element comprising a first side and a second side through which the laser beam passes,
   a spatially-resolving detector configured to detect laser radiation reflected from the transmissive optical element, and an image evaluation device coupled to the detector, wherein the image evaluation device is configured to distinguish laser radiation reflected from the first side of the optical element from laser radiation reflected from the second side of the optical element, and is further configured to determine a focal position of the laser beam on the workpiece based on the reflected radiation, wherein the apparatus is configured to determine the focal position of the laser beam based on the size of the beam spot formed on the detector by the laser radiation reflected from the first side of the optical element or the laser radiation reflected from the second side of the optical element.

2. The apparatus of claim 1, wherein the apparatus comprises an aperture for suppressing the laser radiation reflected from one of the sides.

3. The apparatus of claim 1, wherein both the first and the second side of the transmissive optical element comprise an anti-reflective coating.

4. The apparatus of claim 1, wherein the transmissive optical element is a planar plate.

5. The apparatus of claim 1, wherein the spatially-resolving detector is arranged at the tilting angle with respect to the plane perpendicular to the beam axis.

6. The apparatus of claim 1, wherein the transmissive optical element is arranged in a convergent beam path of the laser beam.

7. The apparatus of claim 1, further comprising a beam-shaping element which is arranged in a beam path of the laser beam upstream of the transmissive optical element for focusing the laser beam onto the workpiece.

8. The apparatus of claim 7, wherein the beam-shaping element is a focusing lens.

9. The apparatus of claim 8, wherein the detector is arranged at a distance from the focusing lens which corresponds to a focal length of the focusing lens.

10. The apparatus of claim 1, wherein the tilting angle is between 5° and 25°.

11. The apparatus of claim 1, further comprising a folding mirror for redirecting the laser radiation reflected onto the detector.

12. The apparatus of claim 1, wherein the apparatus is configured to determine a contamination state of the transmissive optical element based on the laser radiation reflected from the first side of the optical element and based on the laser radiation reflected from the second side of the optical element.

13. The apparatus of claim 12, wherein the apparatus is configured to determine a contamination state of the transmissive optical element based on the difference between the sizes of beam spots formed on the detector by the laser radiation reflected from the first side of the optical element and the laser radiation reflected from the second side of the optical element.

14. The apparatus of claim 1, further comprising:
a device for changing the focal position of the laser beam along a beam axis, and
a control device which is configured to control the device for changing the focal position to adjust the focal position to a desired focal position.

15. An apparatus for focusing a laser beam on a workpiece, comprising:
at least one transmissive optical element which is arranged at a tilting angle with respect to a plane perpendicular to a beam axis of the laser beam, the transmissive optical element comprising a first side and a second side through which the laser beam passes,
a spatially-resolving detector configured to detect laser radiation reflected from the first side and the second side of the transmissive optical element,
an aperture arranged between the transmissive optical element and the detector for suppressing the laser radiation reflected from one of the first and second sides, and
an image evaluation device coupled to the detector, wherein the image evaluation device is configured to determine a focal position of the laser beam on the workpiece based on the reflected radiation, wherein the apparatus is configured to determine the focal position of the laser beam based on the size of the beam spot formed on the detector by the laser radiation reflected from the first side of the optical element or the laser radiation reflected from the second side of the optical element.

16. The apparatus of claim 15, wherein the image evaluation device is configured to determine a contamination state of the transmissive optical element based on the difference between the sizes of beam spots formed on the detector by the laser radiation reflected from the first side of the optical element and the laser radiation reflected from the second side of the optical element.

17. The apparatus of claim 15, wherein the aperture is displaceable for suppressing the laser radiation reflected from the first side or the second side of the optical element.

* * * * *